US012288655B2

(12) United States Patent
Maloney et al.

(10) Patent No.: US 12,288,655 B2
(45) Date of Patent: Apr. 29, 2025

(54) ARC CHUTE ENERGY BYPASS IN CIRCUIT BREAKERS

(71) Applicant: EATON INTELLIGENT POWER LIMITED, Dublin (IE)

(72) Inventors: James G. Maloney, Industry, PA (US); Rachel A. Dunn, Canonsburg, PA (US); Mike Cantor, Cambridge (GB)

(73) Assignee: EATON INTELLIGENT POWER LIMITED, Dublin (IE)

( * ) Notice: Subject to any disclaimer, the term of this patent is extended or adjusted under 35 U.S.C. 154(b) by 197 days.

(21) Appl. No.: 18/062,634

(22) Filed: Dec. 7, 2022

(65) Prior Publication Data

US 2023/0207239 A1 Jun. 29, 2023

Related U.S. Application Data

(60) Provisional application No. 63/294,116, filed on Dec. 28, 2021.

(51) Int. Cl.

*H01H 33/14* (2006.01)
*H01H 33/20* (2006.01)
*H01H 37/52* (2006.01)
*H01H 89/04* (2006.01)

(52) U.S. Cl.

CPC ............ *H01H 33/14* (2013.01); *H01H 33/20* (2013.01); *H01H 37/52* (2013.01); *H01H 89/04* (2013.01)

(58) Field of Classification Search

CPC ........ H01H 33/14; H01H 33/20; H01H 37/52; H01H 89/04; H01H 73/18; H01H 9/362; H01H 9/46; H01H 9/36; H01H 71/48; H01H 71/16

USPC ........ 218/15, 34, 36, 38, 40, 46; 337/37, 36, 337/59, 70, 111; 361/99, 105, 102, 93.8

See application file for complete search history.

(56) References Cited

U.S. PATENT DOCUMENTS

| | | | | |
|---|---|---|---|---|
| 3,213,249 | A * | 10/1965 | Ellsworth | H01H 71/524 335/37 |
| 6,515,569 | B2 | 2/2003 | Lias et al. | |
| 6,894,594 | B2 * | 5/2005 | Fello | H01H 71/524 335/35 |
| 8,735,758 | B2 * | 5/2014 | Chen | H01H 73/045 335/16 |
| 9,887,050 | B1 * | 2/2018 | Cox | H01H 9/362 |
| 10,229,793 | B2 * | 3/2019 | Maloney | H01H 9/302 |
| 10,361,043 | B2 * | 7/2019 | Okerman | H01H 71/46 |
| 10,958,063 | B2 * | 3/2021 | Jimenez | H02H 3/16 |

(Continued)

*Primary Examiner* — William A Bolton

(74) *Attorney, Agent, or Firm* — Eckert Seamans Cherin & Mellott, LLC

(57) ABSTRACT

An arc bypass assembly for use in a circuit breaker includes: an arc chute including a base, two arc sides extending from the base, and a plurality of arc plates arranged within the two arc sides, the arc chute structured to dissipate an arc upon opening of primary contacts of the circuit breaker during a high current event; an arc horn extending outwardly from a first edge of the base of the arc chute toward a primary stationary contact coupled to a line-in conductor, the arc horn structured to attract the arc; and an arc bypass wire coupled to the base of the arc chute at one end and to a secondary stationary arm of the circuit breaker at another end, where the arc bypass assembly is structured to redirect a portion of current generated during the high current event to the load.

19 Claims, 16 Drawing Sheets

(56) References Cited

U.S. PATENT DOCUMENTS

| | | | | |
|---|---|---|---|---|
| 2011/0132875 | A1* | 6/2011 | Werner | H01H 71/16<br>218/154 |
| 2016/0260570 | A1* | 9/2016 | Watford | H01H 36/02 |
| 2020/0136365 | A1* | 4/2020 | Courson | H02H 1/0015 |

* cited by examiner

ARC CHUTE ENERGY BYPASS IN CIRCUIT BREAKERS

CROSS-REFERENCE TO RELATED APPLICATION:

The application claims priority to U.S. Provisional Patent Application No. 63/294,116 filed Dec. 28, 2021, which is incorporated herein by reference in its entirety.

FIELD OF THE INVENTION

The disclosed concept relates generally to an arc chute assembly, and in particular an arc chute energy bypass assembly for remote secondary contacts in a circuit breaker.

BACKGROUND OF THE INVENTION

During a short circuit event, secondary contacts in remote-controlled circuit breakers (e.g., smart circuit breakers controllable by an end-user via wireless or wired connections) may face tack or contact welding due to arcs generated upon opening of primary contacts. For example, for a 10 kA rated circuit breaker, approximately 7 kA of current typically flows through the secondary contacts during a short circuit event, creating tack welding at the secondary contacts and melting the secondary contacts together as a result of the tack welding. In order to prevent the tack welding of the secondary contacts, an arc bypass assembly has been utilized in circuit breakers. In an example circuit breaker shown in FIG. 1A, an arc bypass assembly includes a specific arrangement of a formed copper piece 140, a wire 130', and a contact 620' to translate an arc from the moving contact arm to the terminal 14, as is shown in FIG. 1A. However, the design of circuit breakers is constrained by limited space and the need to satisfy various UL requirements. Therefore, while the arc bypass assembly shown in FIG. 1A may be satisfactory for the particular circuit breaker design shown in FIG. 1A, it may not be suitable for different circuit breaker designs.

There is thus a need for an improved arc bypass assembly for use in a circuit breaker.

SUMMARY OF THE INVENTION

These needs, and others, are met by embodiments of the disclosed concept in which an arc bypass assembly for use in a circuit breaker connected to a power source via a line-in conductor and a load via a load conductor is provided. The arc bypass assembly includes: an arc chute including a base, two arc sides extending from the base, and a plurality of arc plates arranged within the two arc sides, the arc chute structured to dissipate an arc upon opening of primary contacts of the circuit breaker during a high current event; an arc horn extending outwardly from a first edge of the base of the arc chute toward a primary stationary contact coupled to the line-in conductor, the arc horn structured to attract the arc; and an arc bypass wire coupled to the base of the arc chute at one end and to a secondary stationary arm of the circuit breaker at another end, where the arc bypass assembly is structured to redirect a portion of current generated during the high current event to the load.

Another embodiment of the disclosed concept provides a circuit breaker structured to be coupled to a power source via a line-in conductor and a load via a load conductor. The circuit breaker includes primary contacts having a primary moving contact coupled to a primary moving arm and a primary stationary contact coupled to a primary stationary arm at one end and structured to be coupled to the line-in conductor at another end; an operating mechanism structured to cause the primary contacts to open and interrupt current from flowing to the load during a high current event; secondary contacts having a secondary moving contact coupled to a secondary moving arm and a secondary stationary contact coupled to a secondary stationary arm structured to be coupled to the load conductor; an arc bypass assembly disposed on a housing of the circuit breaker. The arc bypass assembly includes: an arc chute including a base, two arc sides extending from the base, and a plurality of arc plates arranged within the two arc sides, the arc chute structured to dissipate an arc generated upon opening of the primary contacts; an arc horn extending outwardly from a first edge of the base of the arc chute toward the primary stationary contact, the arc horn structured to attract the arc; and an arc bypass wire coupled to the base of the arc chute at one end and to the secondary stationary arm at another end, where the arc bypass assembly is structured to redirect a portion of current generated as a result of occurring of the high current event to the load.

Another embodiment of the disclosed concept provides a method of bypassing arc chute energy in a circuit breaker connected between a power source and a load. The method includes determining if a high current event has occurred; in response to a determination that the high current event has occurred, opening primary contacts of the circuit breaker and interrupting current generated as a result of occurring of the high current event from flowing to the load; and redirecting a portion of the current to the load via an arc bypass assembly of the circuit breaker.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
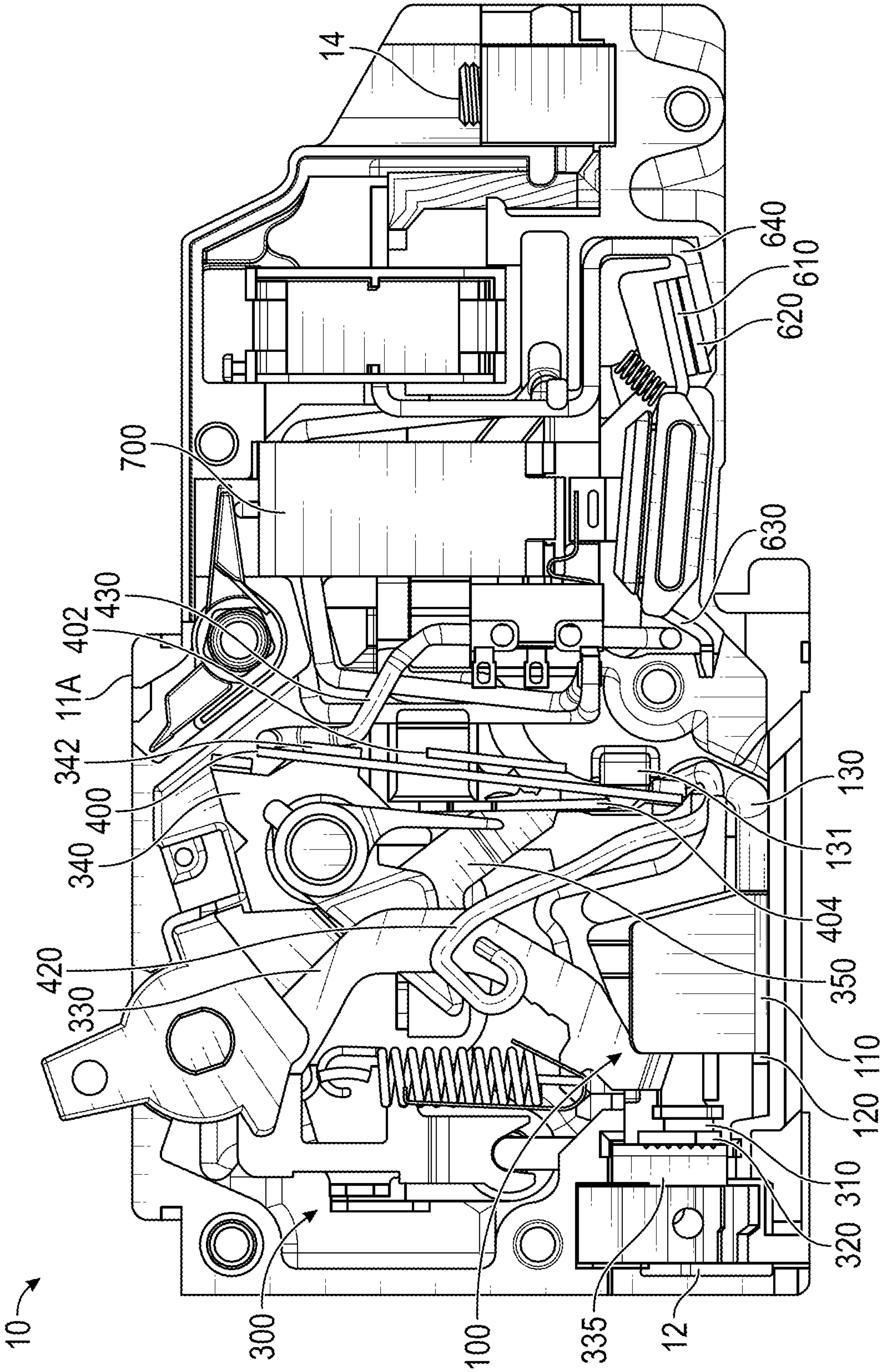
FIG. 1 illustrates an example arc bypass assembly in a circuit breaker according to an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Figure 1A:
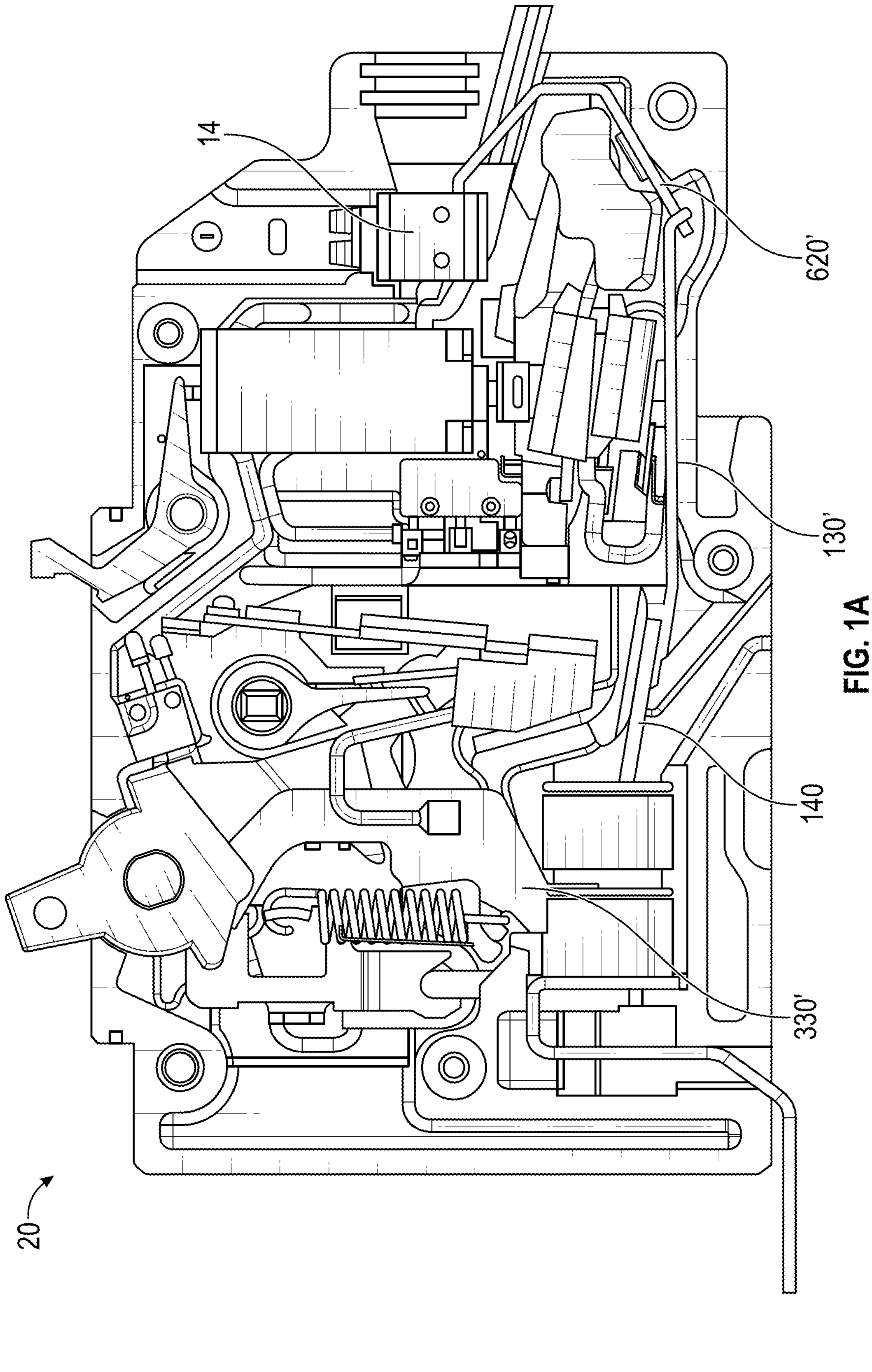
FIG. 1A illustrates a circuit breaker employing a traditional arc bypass assembly.

Some circuit breaker designs, such as those described herein, do not have the space to utilize the arc bypass assembly shown in FIG. 1A. Accordingly, circuit breakers including an arc bypass assembly in accordance with example embodiments of the disclosed concept are described herein. The arc bypass assembly redirects current from the arc chute to the load terminal utilizing an arc bypass wire directly welded to the arc chute. Arc bypass assemblies in accordance with example embodiments of the disclosed concept fit within the space available in the circuit breaker designs described herein while satisfying performance and UL safety requirements.

FIG. 1 illustrates an example arc bypass assembly 100 in a circuit breaker 10 according to an example embodiment of the disclosed concept. The circuit breaker 10 may be a remote controlled smart circuit breaker and coupled to a LINE-IN conductor 12 and a LOAD conductor 14, which is in turn coupled to a load (e.g., a lighting system). The circuit breaker 10 includes at least an arc chute bypass assembly 100, primary moving contact 310 coupled to primary moving arm 330 and primary stationary contact 320 coupled to primary stationary arm 335, an operating mechanism 300, secondary moving contact 610 coupled to secondary moving arm 630 and secondary stationary contact 620 coupled to a secondary stationary arm 640.

In normal operation, current flows from the LINE-IN conductor 12 to the LOAD conductor 14 through primary contacts 310,320, primary moving arm 330, a first flexible conductor 420, a bimetal strip 400, a second flexible conductor 430, secondary moving arm 630, secondary moving contact 610, and secondary stationary arm 640. During a short circuit event (high current event), the arc bypass assembly 100 redirects a portion of the high current around the secondary contacts 610,620 and directly from the arc chute to the secondary stationary arm such that tack welding of the secondary contacts 610,620 during the short circuit event is prevented. For example, for a circuit breaker 10 with 10 kA rated current, about 7 kA passes through the secondary contacts 610,620 without the arc bypass assembly 100. With the arc bypass assembly 100, a significant portion (e.g., without limitation, 4 kA) of the 7 kA is redirected in an alternate current path directly from arc chute 110 to the LOAD conductor 14.

The arc bypass assembly 100 includes an arc chute 110, an arc horn 120 and an arc bypass wire 130. The arc chute 110 includes a base, two arc sides extending from the base, and a plurality of arc plates arranged within the two arc sides. The arc chute 110 is structured to dissipate an arc generated upon opening of the primary contacts 310,320 during the high current event.

Figure 6A:
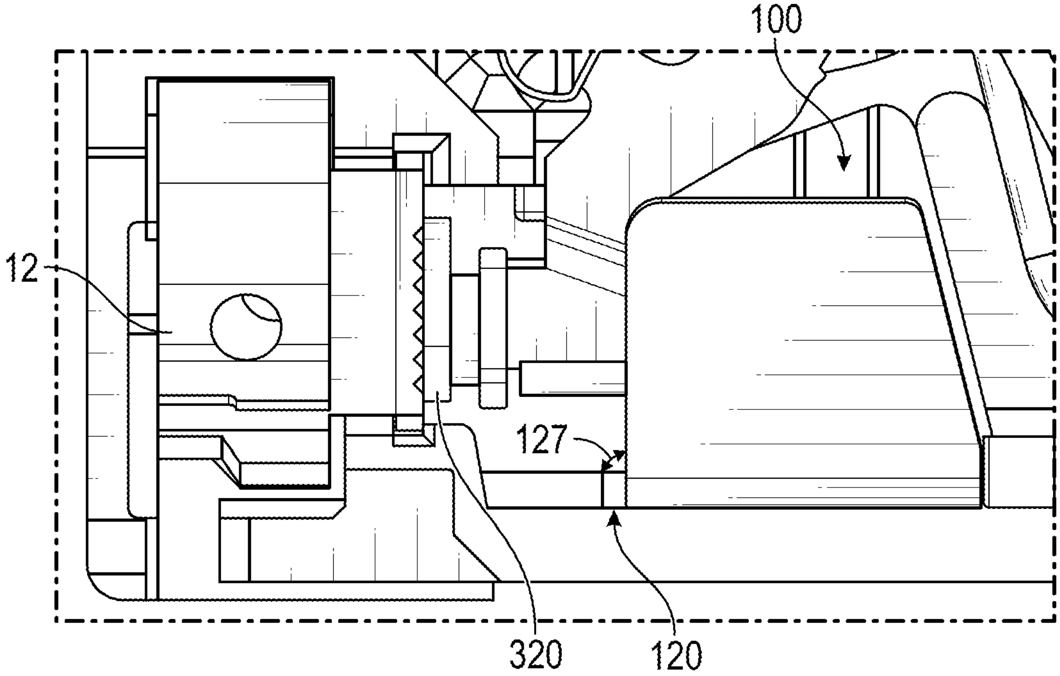
FIGS. 6A-B illustrate an arc horn of an example arc bypass assembly according to an example embodiment of the disclosed concept.
Figure 6B:
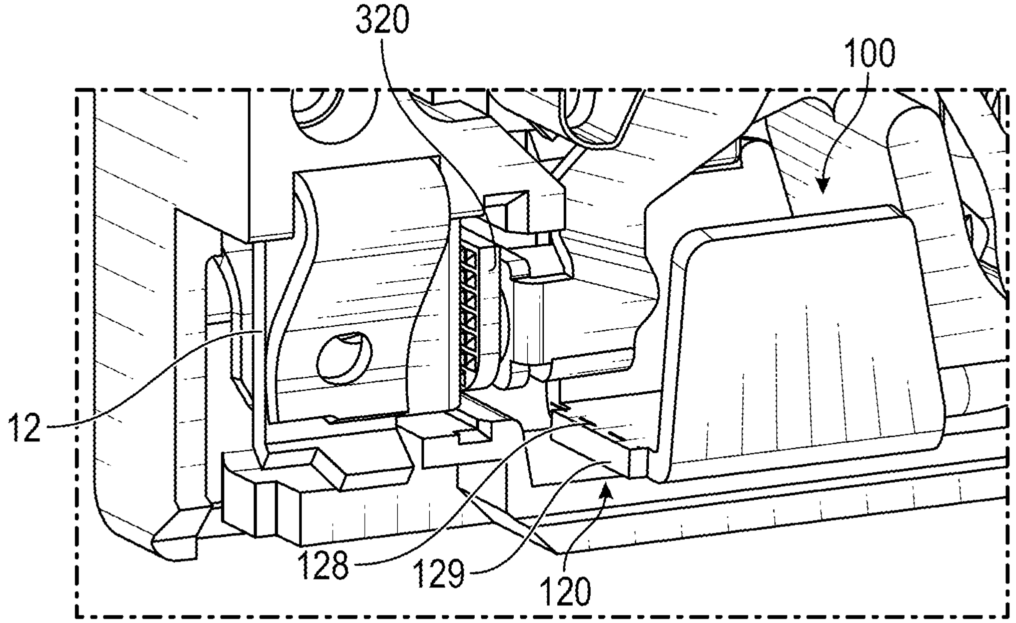
Figure 7:
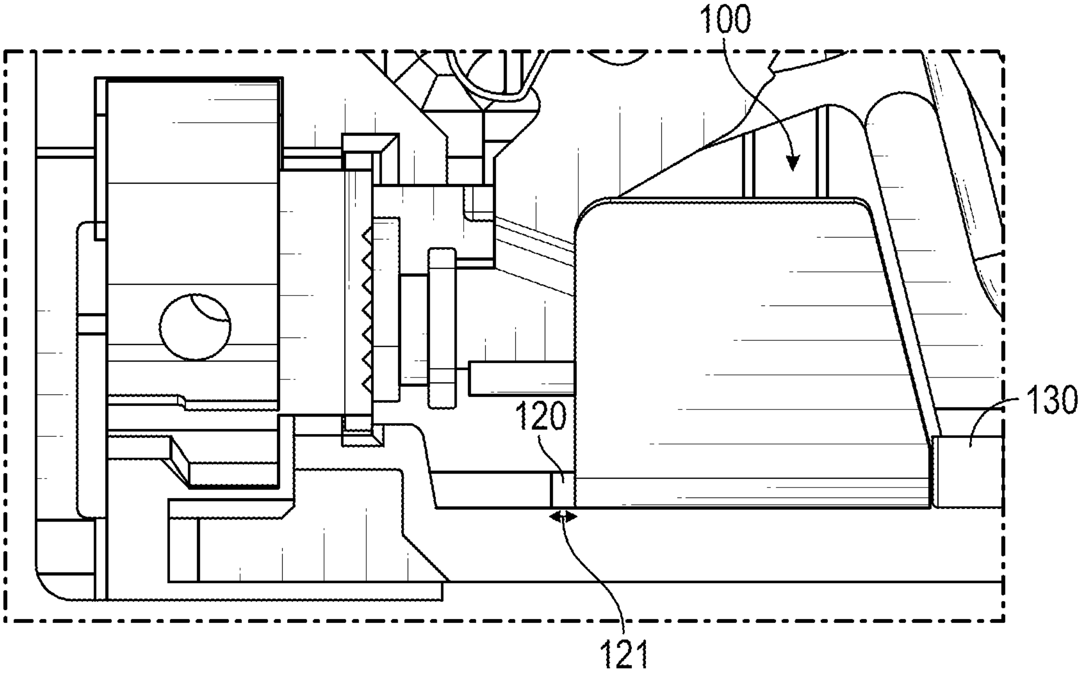
FIG. 7 illustrates details of an arc horn of an example arc bypass assembly according to an example embodiment of the disclosed concept.
Figure 8:
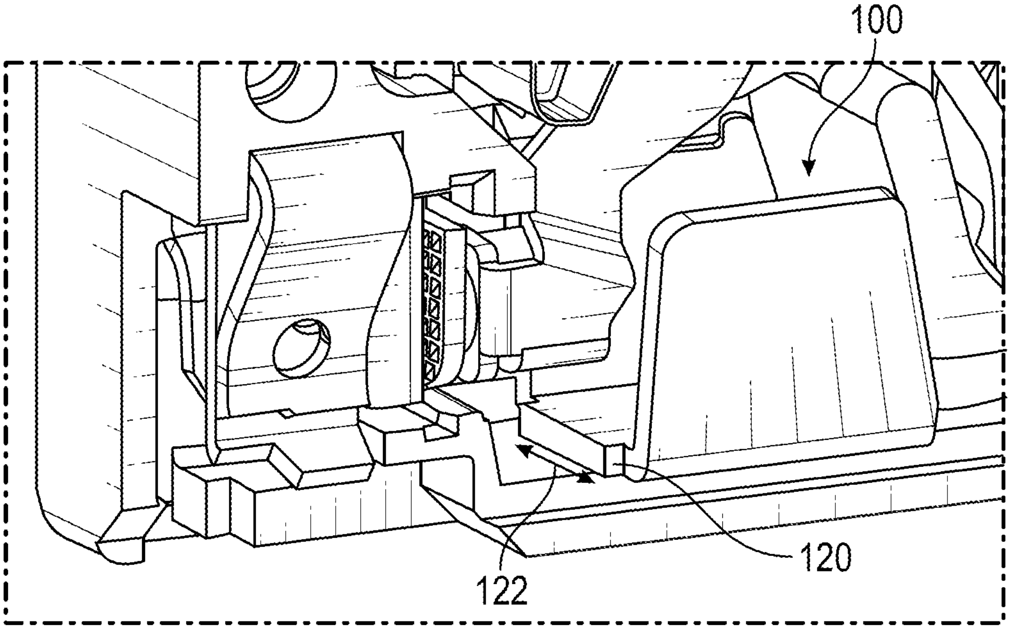
FIG. 8 illustrates details of an arc horn of an example arc bypass assembly according to an example embodiment of the disclosed concept.
Figure 9:
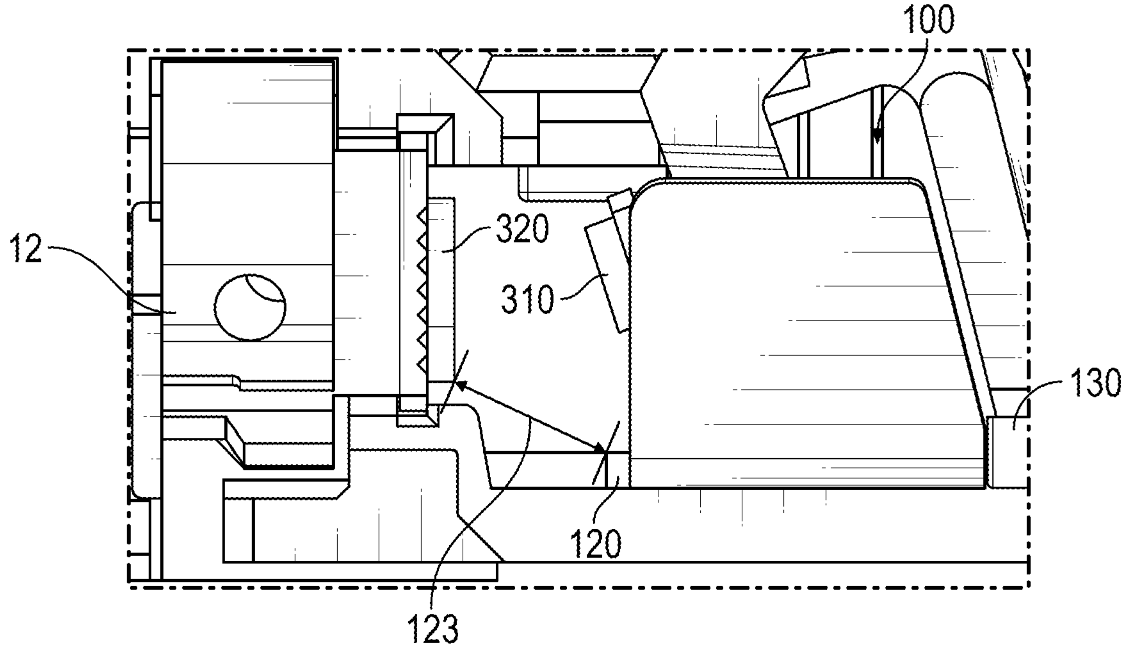
FIG. 9 illustrates distance detail between an example arc bypass assembly and a line contact according to an example embodiment of the disclosed concept.
Figure 10:
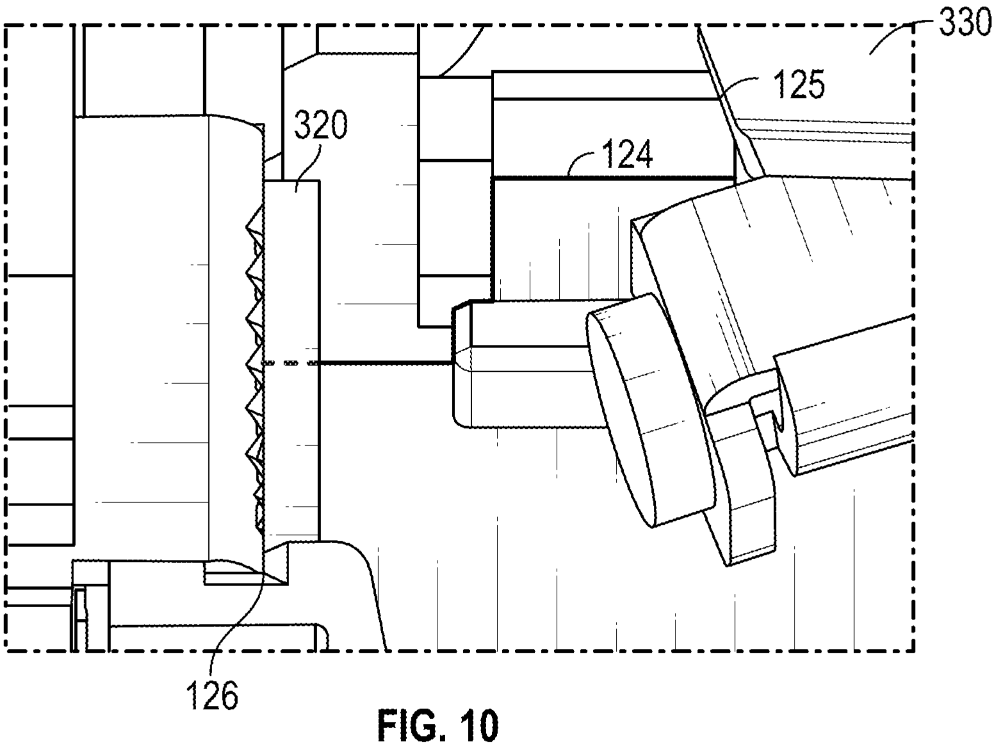
FIG. 10 illustrates distance detail between contact points of primary contacts of a circuit breaker according to an example embodiment of the disclosed concept.

The arc horn 120 may extend outwardly from a first transverse edge 128 of the base of the arc chute 110 towards the primary stationary contact 320, which is coupled to the LINE-IN conductor 12. In some examples, the arc horn 120 may extend horizontally in a direction towards the primary stationary contact 320 and the LINE-IN conductor 12. The arc horn 120 may be a small protrusion from the first transverse edge 128 of the base of the arc chute 110 as shown in FIGS. 6A-B and structured to help attract the arc into the arc bypass assembly 100. As shown in FIGS. 7 and 8, the arc horn 120 may have the length 121 of, e.g., without limitation, 0.040 nominal inches and a width 122 (e.g., without limitation, 0.342 nominal inches) smaller than the width of the base of the arc chute 110. As such, the arc horn 120 provides a sharp 90-degree corner (e.g., without limitation, a 90-degree corner 127 in FIG. 6A) at the first transverse edge 128. This increases the attraction of the arcs by the arc horn 120 since the arcs usually jump from one sharp corner to another sharp corner. Further, by attaching the arc horn 120 at the first transverse edge 128 of the base of the arc chute 110, the arc chute assembly 100 is now positioned closer to the primary stationary contact 320 by the length 121 of the arc horn 120. The closer the arc horn 120 to the primary stationary contact 320, the more current that may be attracted to the arc horn 120. However, by limiting the length 121 to be small e.g., without limitation, 0.040 nominal inches, the arc chute assembly 100 also helps to satisfy the safety requirements such as the UL clearances. For example, the arc horn 120 may have a through-air distance 123 from the primary stationary contact 320 exceeding 0.25 inches as shown in FIG. 9. In some example embodiments, the over-the-surface distance 124 between the primary moving arm and base contact point 125 and the primary stationary contact and base contact point 126 may exceed 0.375 inches as shown in FIG. 10.

Figure 11:
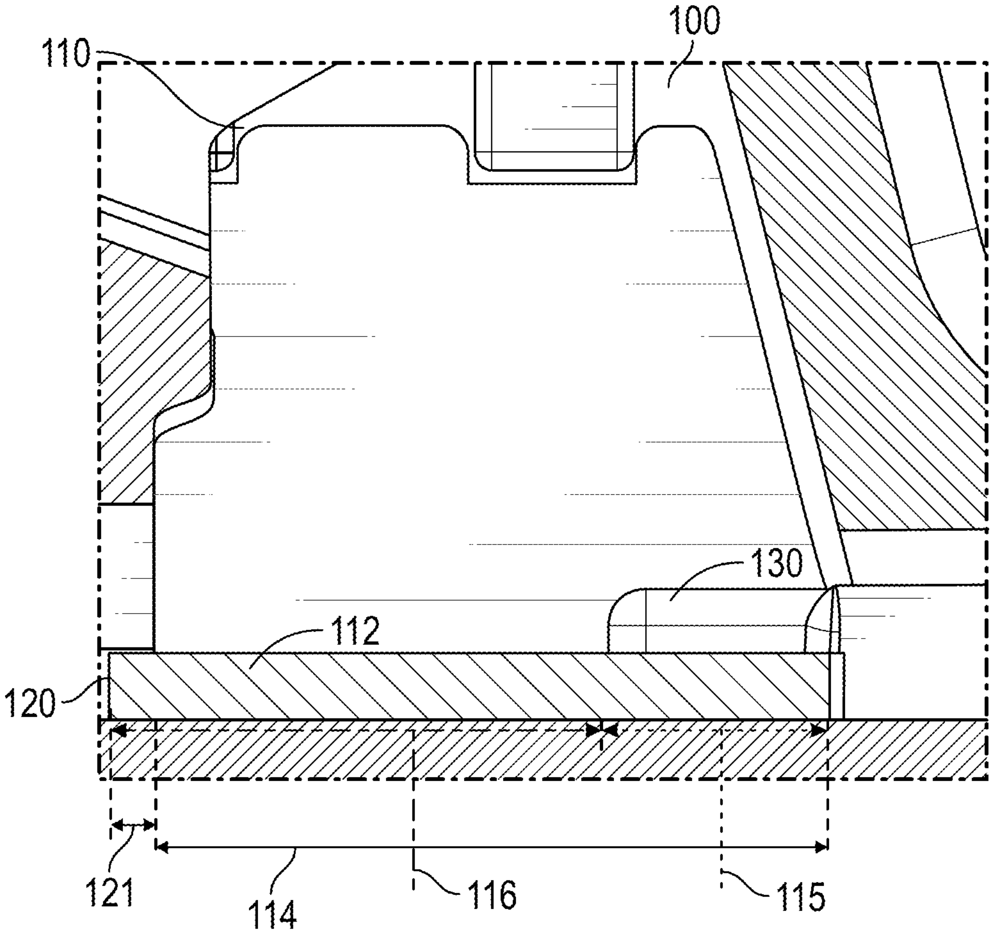
FIG. 11 illustrates location of an arc bypass wire in an example arc bypass assembly according to an example embodiment of the disclosed concept.

The arc bypass wire 130 includes an arc bypass conductor (e.g., copper) within an insulation and is structured to redirect a portion of the high current away from the secondary contacts 610,620 during the high current event. The redirected, alternate current path goes directly from the arc chute 110 to the LOAD conductor 14. The arc bypass wire 130 is coupled to (e.g., without limitation, via welding, etc.) the base of the arc chute 110 at one end and coupled to the secondary stationary arm 640 at the other end as shown in FIGS. 1, 2, 4, 5 and 11. Notably, the one end of the arc bypass wire 130 is located on the base of the arc chute 110 at a distance from the primary contacts 310,320 and hot arcs drawn within the arc chute so as to prevent fusing of the arc bypass conductor. That is, if the arc bypass wire 130 is arranged too close to the primary contacts 310,320 and the arcs, the arc bypass conductor may melt. As such, coupling (e.g., via welding, etc.) the arc bypass wire 130 to the arc chute 110 far enough from the primary contacts 310,320 and the hot arcs in the limited space available within the remote circuit breakers in order to prevent the arcs from vaporizing the arc bypass conductor is important for redirecting of the current while satisfying UL safety protocols. FIG. 11 shows an example positioning of the arc bypass wire 130 within the arc chute 110 that keeps the arc bypass wire 130 at a safe distance from the primary contacts 310,320 and the arcs. In FIG. 11, an arc chute 110 has the base length 114 of, e.g., without limitation, 0.600 nominal inches with the arc horn 120 attached to the first transverse edge of the arc chute 110, the arc horn having the length 121 of, e.g., without limitation, 0.040 nominal inches. The one end of the arc bypass wire 130 is arranged on the base 112 of the arc chute 110 at a distance 116 of, e.g., without limitation, 0.440 nominal inches from a transverse edge 129 of the arc horn 120 opposite the first transverse edge 128 of the base of the arc chute 110. About, e.g., without limitation, 0.200 nominal inches of the arc bypass wire 130 from the one end lies within the arc chute 110. Thus, the embodiments in accordance with the present disclosure prevents fusion of the arc bypass conductor by proper positioning of the arc bypass wire 130 within the arc chute 110.

In addition, the arc bypass wire 130 is held in place at a predetermined position by a retention mechanism so as to prevent the wire 130 from interfering with, e.g., the thermal trip assembly (bimetal strip 400, magnetic yoke 402, magnetic armature 404, etc.) of the circuit breaker 10. In order to hold the arc bypass wire 130 rigidly in the predetermined position, the frame, housing or casing 11A of the circuit breaker 10 may be first modified to include slots 134,135 (as shown in FIGS. 14B and 15A) to tightly route the arc bypass wire 130. Slot 134 is made in the area 137 (see FIGS. 14A-B) in the bottom part of the circuit breaker 10 and extends downward diagonally in order to ensure the wire 130 does not interfere with the operations of near-by components, and slot 135 is made in the upper part of the circuit breaker 10 for tight fitting the arc bypass wire 130 to the slot 135 behind the solenoid 700. Then, the molded retention mechanisms may be added to hold the arc bypass wire 130 in place.

Figure 13A:
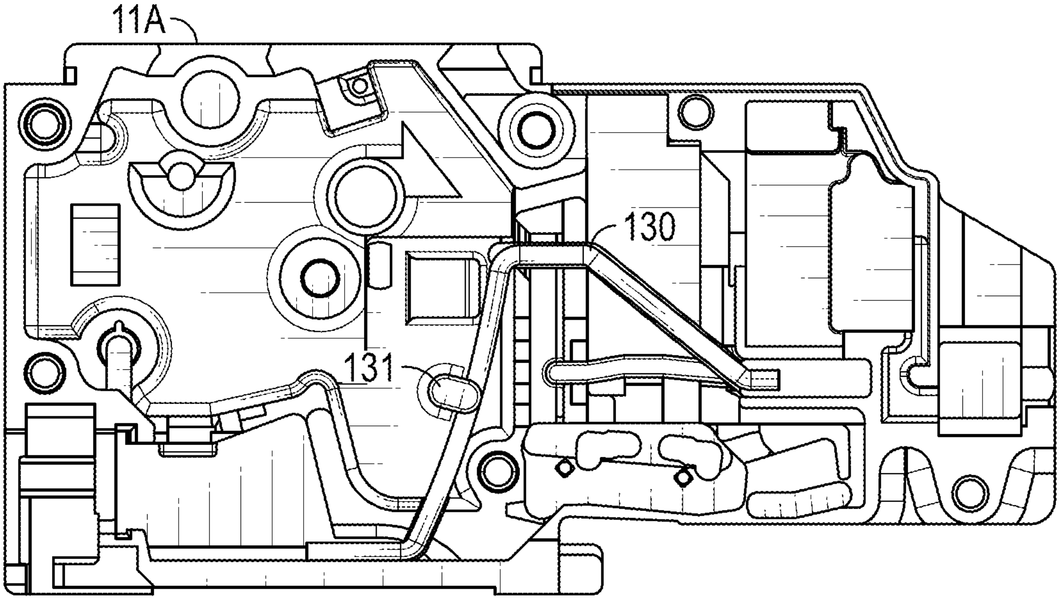
FIGS. 13A-C illustrate an example retention mechanism for an example arc bypass wire of an example arc bypass assembly in a circuit breaker according to an example embodiment of the disclosed concept.
Figure 13B:
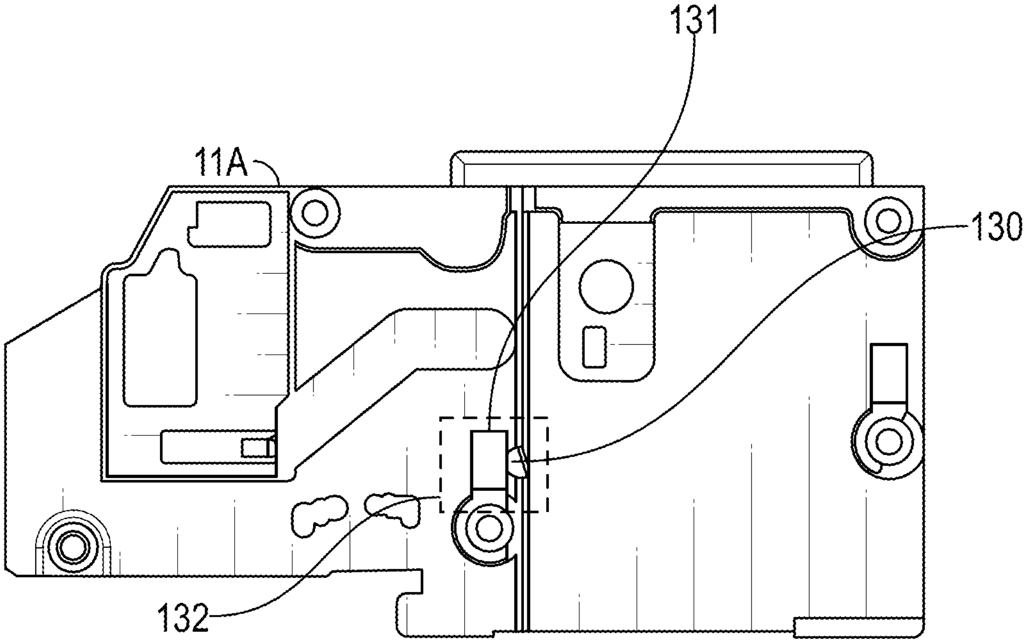
Figure 13C:
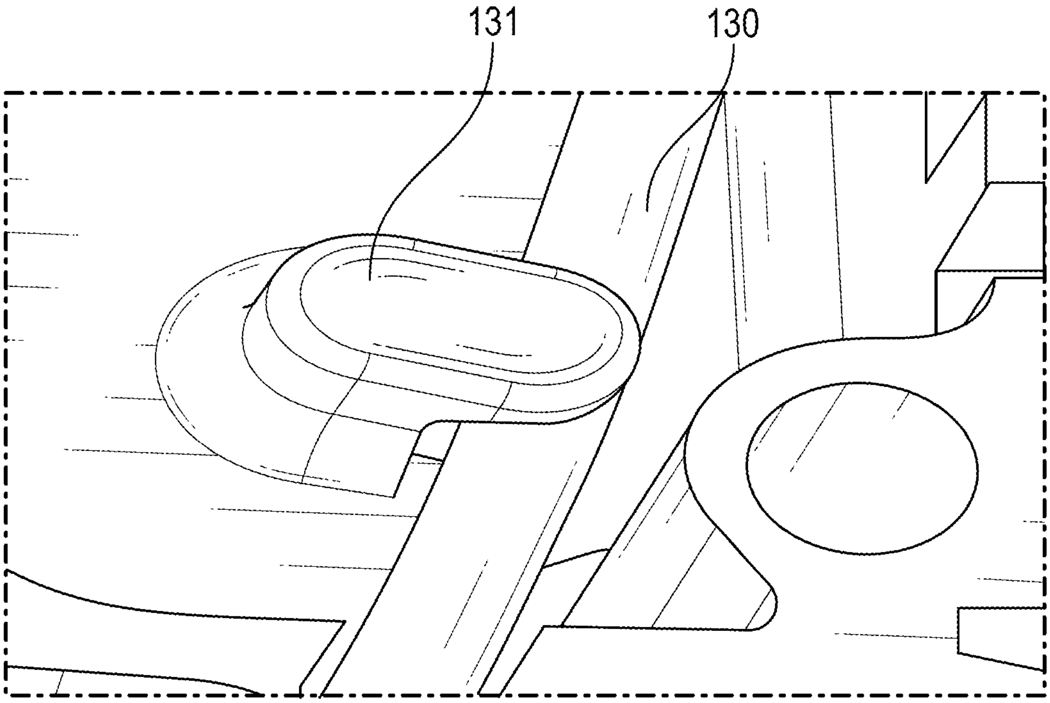
Figure 15A:
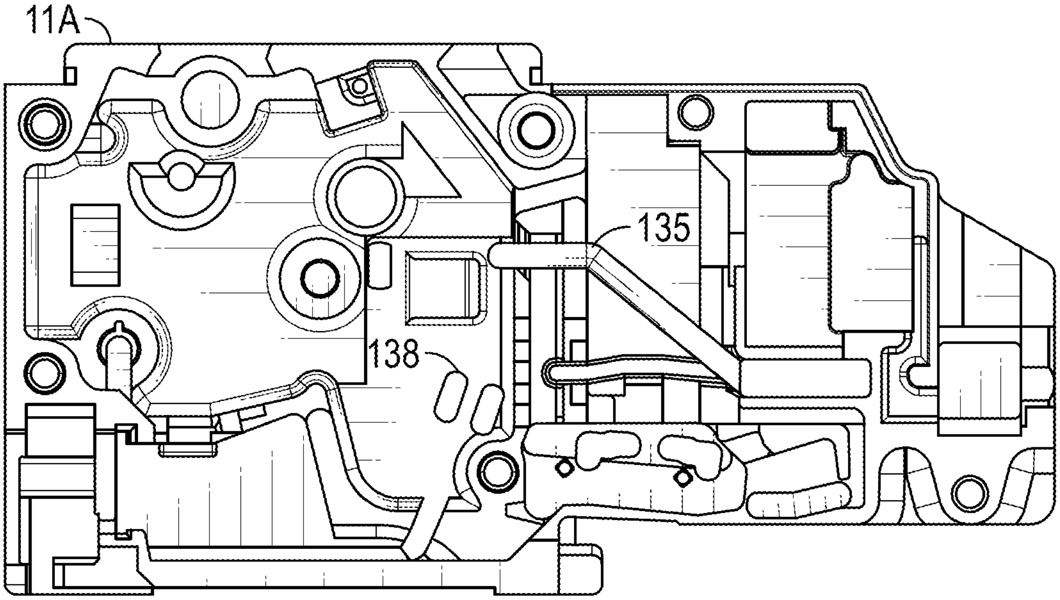
FIGS. 15A-B illustrate a third example retention mechanism for an example arc bypass wire of an example arc bypass assembly in a circuit breaker according to an example embodiment of the disclosed concept.

In some example embodiments, the molded retention mechanism may include a hold-down tab 131 as shown in FIGS. 13A and 13C. The hold-down tab 131 holds the arc bypass wire 130 in place and prevents the wire 130 from interfering with, e.g., the thermal trip assembly (e.g., bimetal strip 400, magnetic yoke 402, magnetic armature 404, first and second flexible conductors 420,430) and the operating mechanism components (e.g., support plate 340 and its tip 342, cradle 350). An indicator 132 may be provided for indicating whether the wire 130 is held tightly under the tab 131 properly. The indicator 132 may be., e.g., without a limitation, a viewing window on the casing 11A of the circuit breaker 10 as shown in FIGS. 13B and 16. In FIGS. 13B and 16, the indicator 132 shows that the wire 130 is properly routed as the wire 130 is visibly seen through the indicator 132. In some example embodiments, the molded retention mechanism may include a pair of posts 133 separated by a gap, which is slightly less than the diameter of the arc bypass wire 130 for press fitting the wire 130. In some example embodiments, the molded retention mechanism may include a tie 136 tying the wire 130 via a pair of through-holes 138 (see FIGS. 15A-B). The indicator 132 may show whether the wire 130 is held in a predetermined position underneath the tie 136 and within the gap between the pair of through-holes 138.

Figure 2:
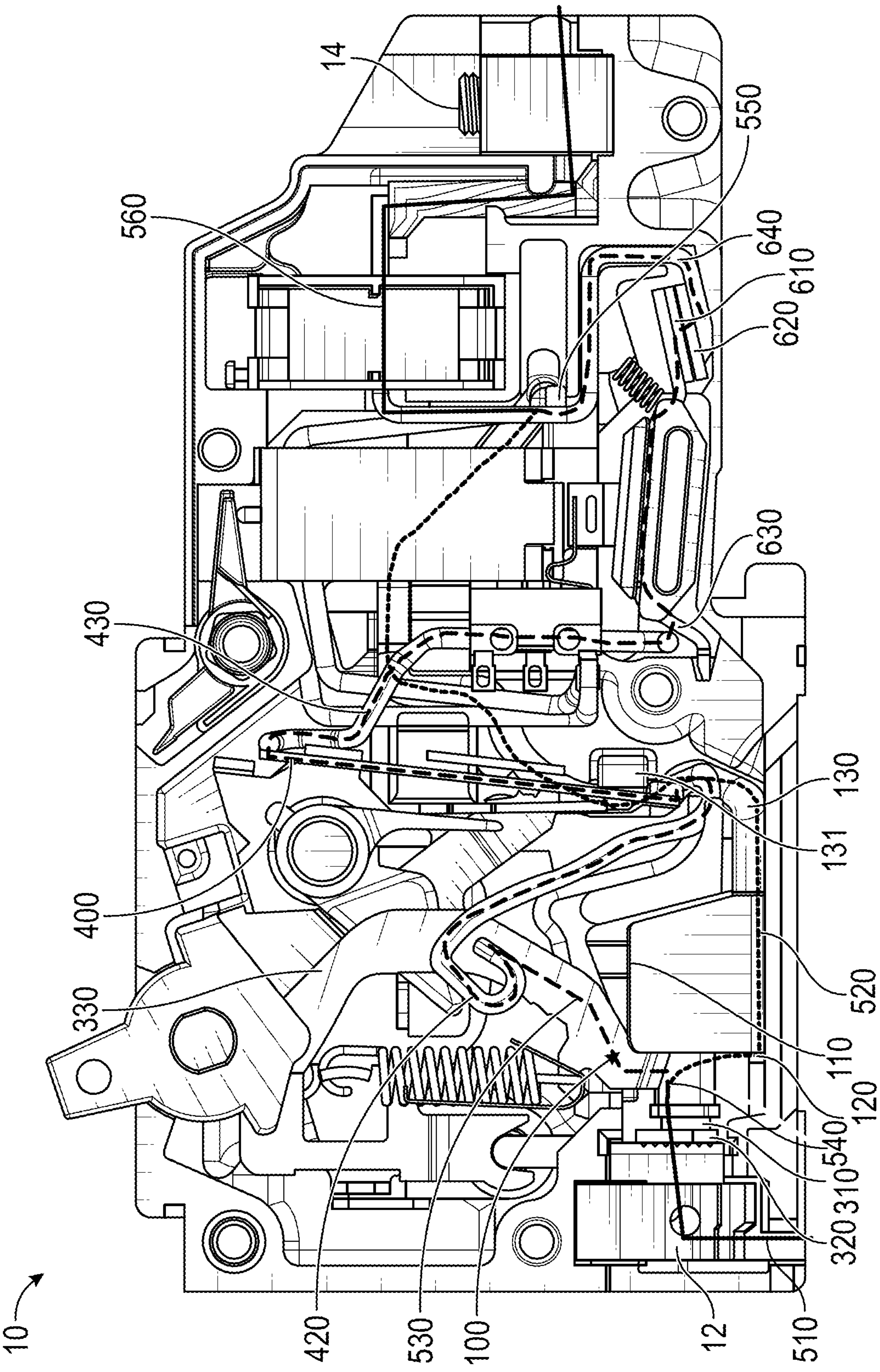
FIG. 2 illustrates current paths in a circuit breaker using an example arc bypass assembly according to an example embodiment of the disclosed concept.

FIG. 2 illustrates current paths in a circuit breaker 10 using an example arc bypass assembly 100 according to an example embodiment of the disclosed concept. The line current $I_{Line\text{-}In}$ flows from an AC power source via the LINE-IN conductor 12. Upon an occurrence of a high current event, the line current $I_{Line\text{-}In}$ 510 splits into two current streams $I_{In}$ (input current) 530 and $I_{Arcbypass}$ (arc bypass current) 520 at point 540. The input current $I_{In}$ flows the same path as the current during normal operation as described with reference to FIG. 1. The arc bypass current $I_{Arcbypass}$ flows to the load via the primary moving arm 310, the arc horn 120, the base of the arc chute 110, the arc bypass wire 130, and the secondary stationary arm 640. Then, at point 550 the input current $I_{In}$ 530 and the arc bypass current $I_{Arcbypass}$ 520 join as the load current $I_{Load}$ 560, which is fed to the load. For example, for a circuit breaker 10 with 10 kA rated current, the arc bypass assembly 100 redirects, e.g., without limitation, 4 kA of current directly from the arc chute 110 to the load while remaining current (e.g., without limitation 3 kA) flows through the secondary contacts 610, 620. 4 kA is a significant amount of current being redirected away from the secondary contacts 610,620.

Figure 3:
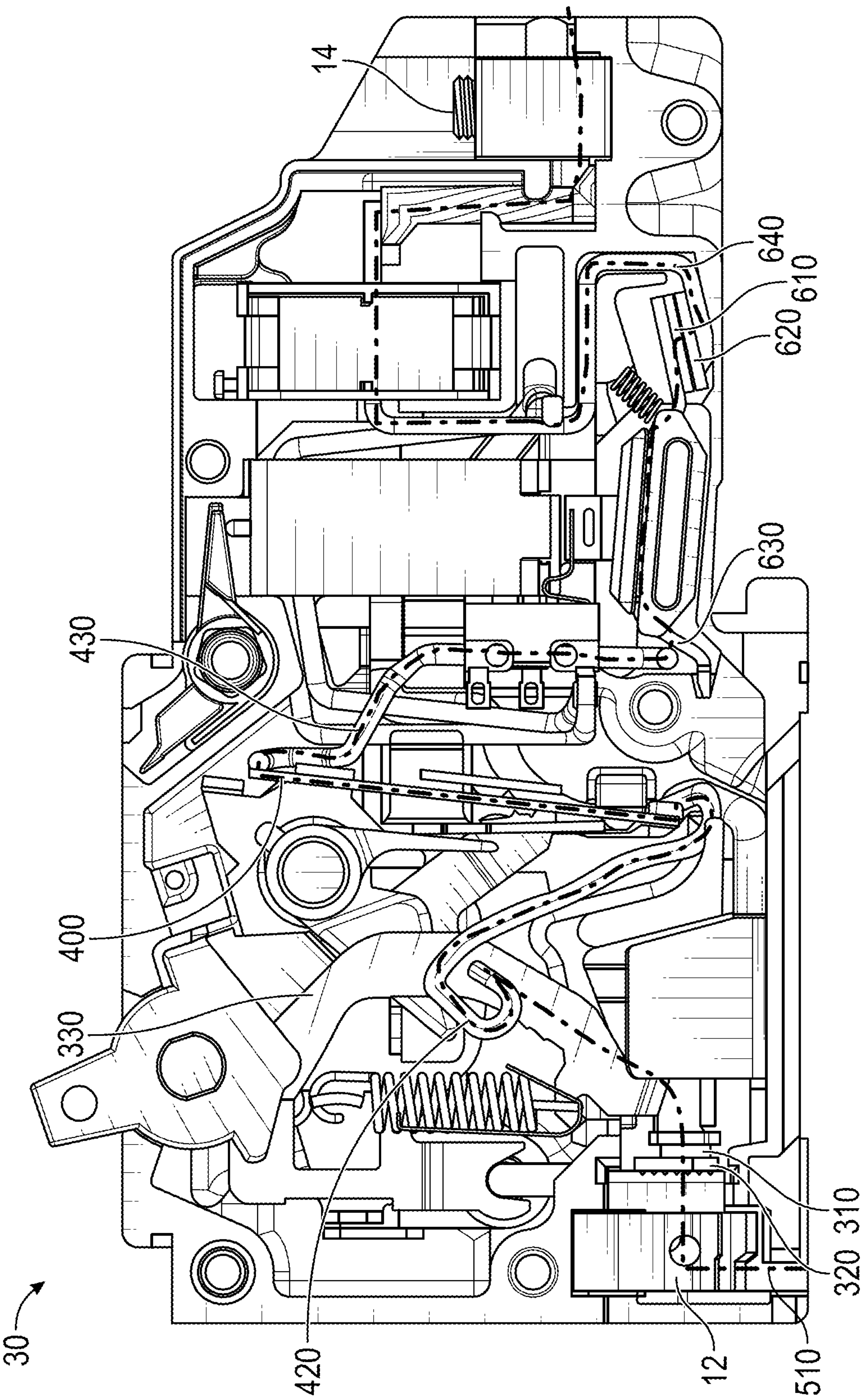
FIG. 3 illustrates a current path in a circuit breaker without an arc bypass assembly.

FIG. 3 illustrates a current path in a circuit breaker 30 without an arc bypass wire 130 incorporated therein. The circuit breaker 30 is the same as the circuit breaker 10 of FIG. 1, except that it does not have the arc bypass wire 130 as described with reference to FIG. 1. The line current $I_{Line\text{-}In}$ 510 flows the same path as the current during normal operation as described with reference to FIG. 1.

Figure 4:
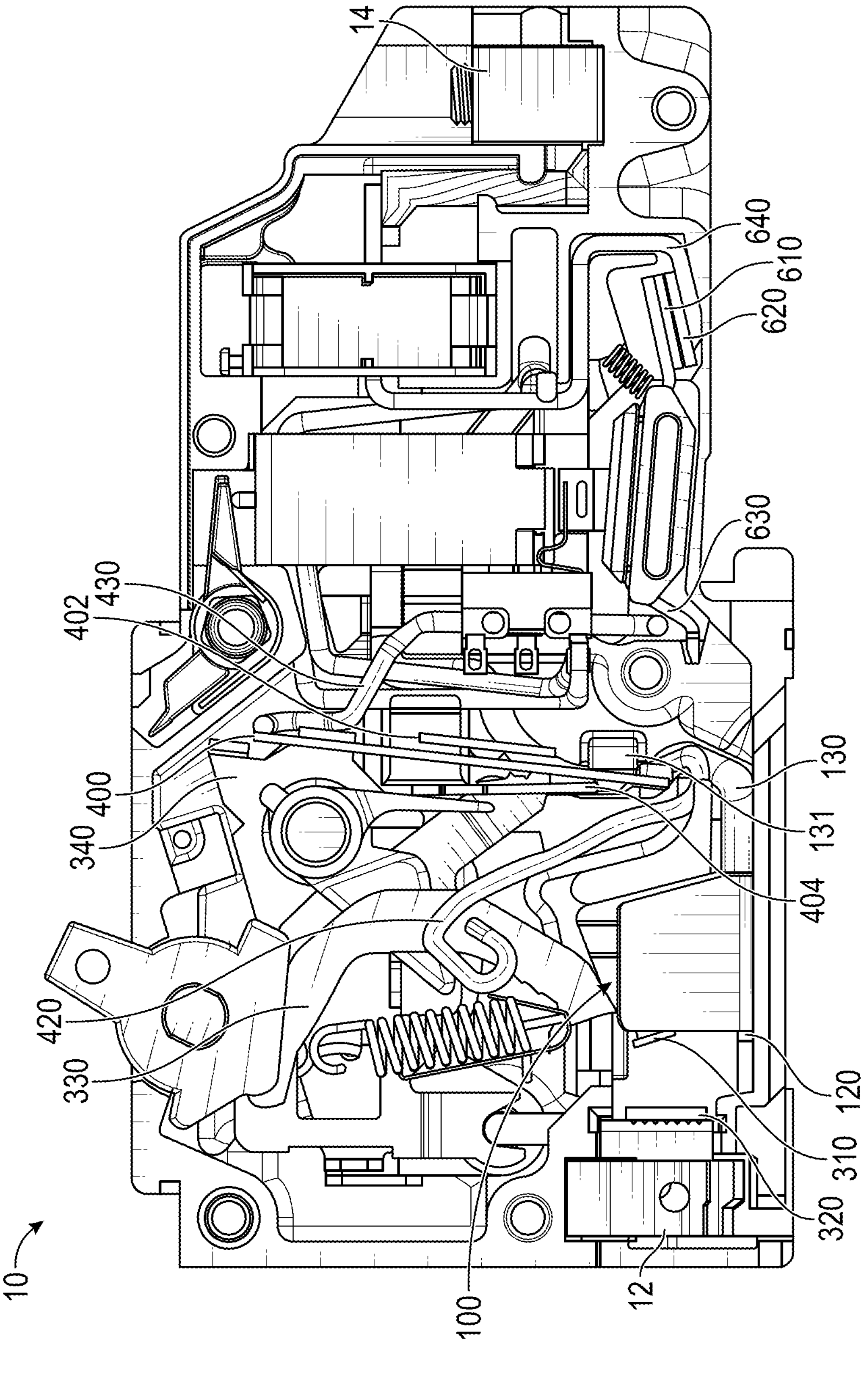
FIG. 4 illustrates a circuit breaker using an example arc bypass assembly in an OFF position according to an example embodiment of the disclosed concept.
Figure 5:
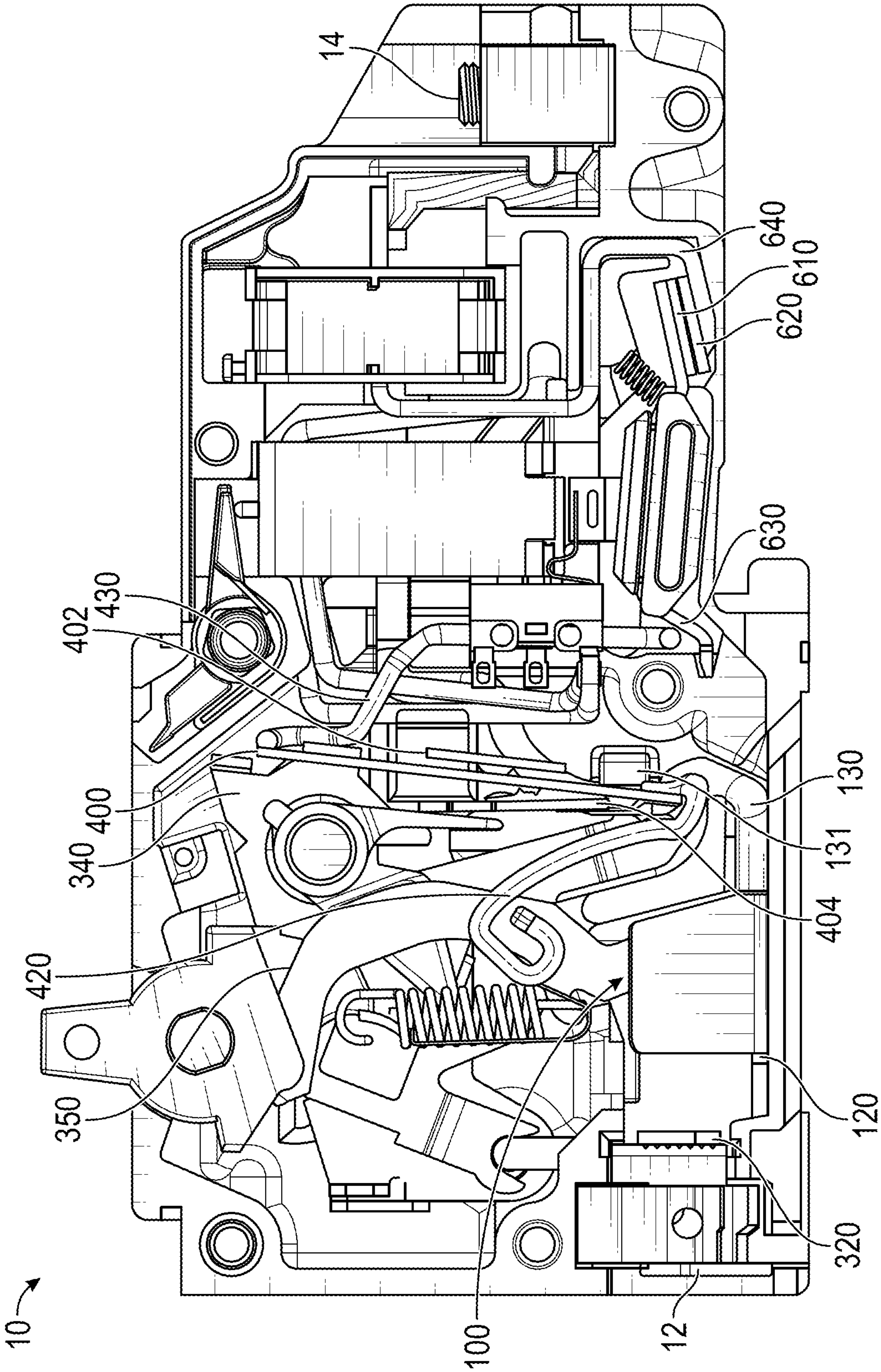
FIG. 5 illustrates a circuit breaker using an example arc bypass assembly in a TRIP position according to an example embodiment of the disclosed concept.

FIG. 4 illustrates a circuit breaker 10 including an arc bypass assembly 100 in an OFF position according to an example embodiment of the disclosed concept. FIG. 5 illustrates a circuit breaker 10 including an arc bypass assembly 100 in a TRIP position according to an example embodiment of the disclosed concept. FIGS. 4 and 5 indicate that the circuit breakers utilizing the example arc bypass assembly 100 in accordance with the present disclosure maintain the proper UL clearances and proper distance of the arc bypass assembly 100 from the primary contacts 310,320 during the OFF and TRIP positions.

FIGS. 6A-B illustrate an arc horn 120 of an example arc bypass assembly 100 according to an example embodiment of the disclosed concept. The arc horn 120 may be a small protrusion from the first transverse edge of the arc chute 110 as shown in FIGS. 6A-B.

FIG. 7 illustrates details of an arc horn 120 of an example arc bypass assembly 100 according to an example embodiment of the disclosed concept. FIG. 8 illustrates details of an arc horn 120 of an example arc bypass assembly 100 according to an example embodiment of the disclosed concept. As shown in FIGS. 7 and 8, the arc horn 120 may have the length 121 of, e.g., without limitation, 0.040 nominal inches and a width 122 of, e.g., without limitation, 0.342 nominal inches.

FIG. 9 illustrates distance detail between an example arc bypass assembly 100 and a primary stationary contact 320 according to an example embodiment of the disclosed concept. The arc horn 120 may have a through-air distance 123 from the primary stationary contact 320 exceeding 0.25 inches as shown in FIG. 9.

FIG. 10 illustrates distance detail between contact points of primary contacts of a circuit breaker according to an example embodiment of the disclosed concept. The over-the-surface distance 124 between the primary moving arm and base contact point 125 and the primary stationary contact 320 and base contact point 126 may exceed 0.375 inches as shown in FIG. 10.

FIG. 11 illustrates location of an arc bypass wire 130 in an example arc bypass assembly 100 according to an example embodiment of the disclosed concept. FIG. 11 shows an example positioning of the arc bypass wire 130 within the arc chute 110 that keeps the arc bypass wire 130 at a safe distance from the primary contacts 310,320 and the arcs. In FIG. 11, an arc chute 110 has the base length 114 of, e.g., without limitation, 0.600 nominal inches with the arc horn 120 attached to the first transverse edge of the arc chute 110, the arc horn having the length 121 of, e.g., without limitation, 0.040 nominal inches. The one end of the arc bypass wire 130 is coupled to (e.g., via welding) the base 112 of the arc chute 110 at a distance 116 of, e.g., without limitation, 0.440 nominal inches from the arc horn 120. About, e.g., without limitation, 0.200 nominal inches of the arc bypass wire 130 from the one end lies within the arc chute 110.

Figure 12:
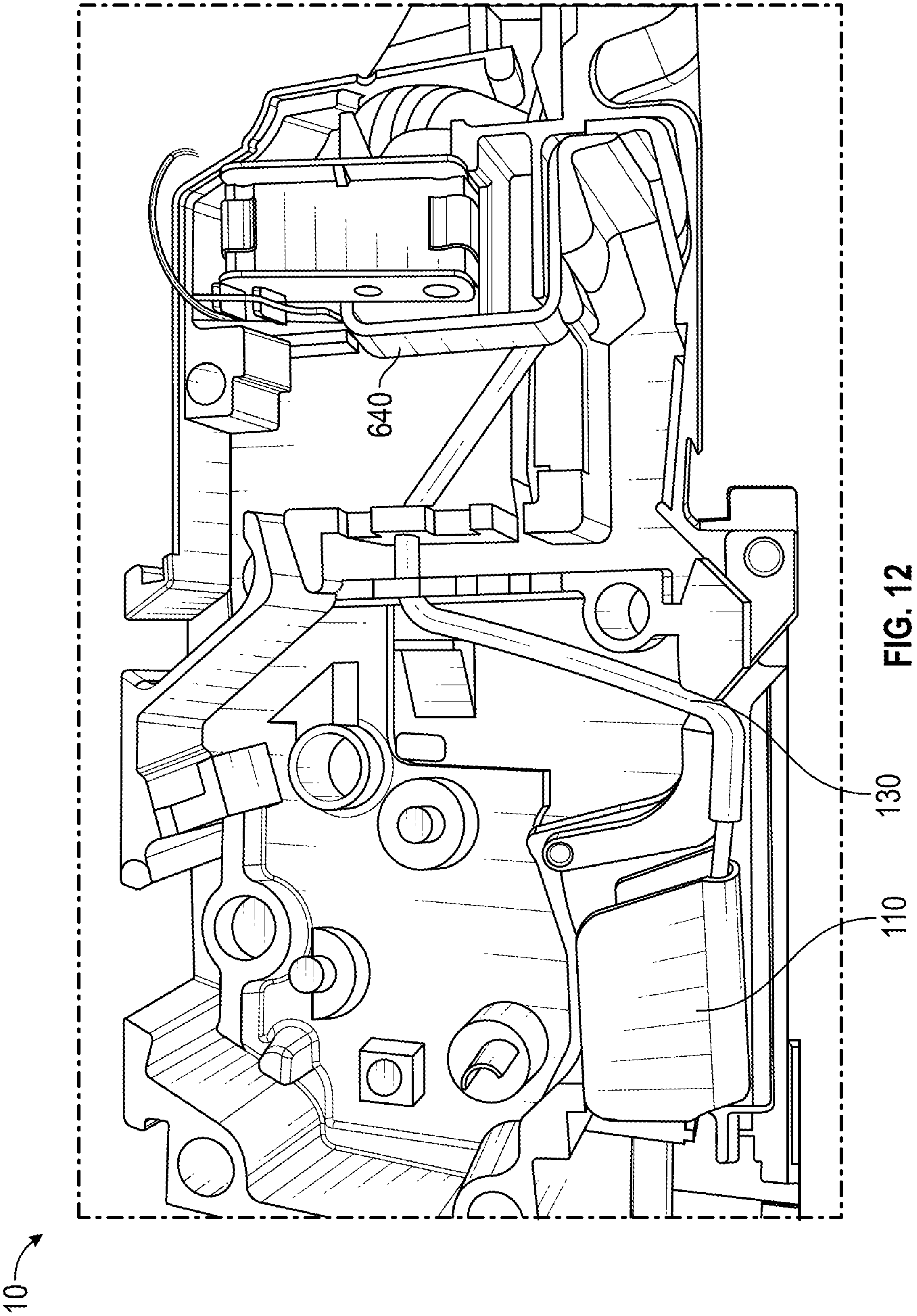
FIG. 12 illustrates an internal view of an example arc bypass wire in a circuit breaker according to an example embodiment of the disclosed concept.

FIG. 12 illustrates an internal view of an example arc bypass wire 130 of in a circuit breaker 10 according to an example embodiment of the disclosed concept. FIG. 12 shows a prototype of the circuit breaker 10 with rerouting of current during a high current event directly from the arc chute 110 to the secondary stationary arm 640 via the arc bypass wire 130.

FIGS. 13A-C illustrate an example retention mechanism for an example arc bypass wire 130 of an example arc bypass assembly 100 in a circuit breaker according to an example embodiment of the disclosed concept. FIGS. 13A-C show a hold-down tab 131 as the molded retention mechanism and an indicator 132 for indicating whether the arc bypass wire 130 is held properly in place by the tab 131.

Figure 14A:
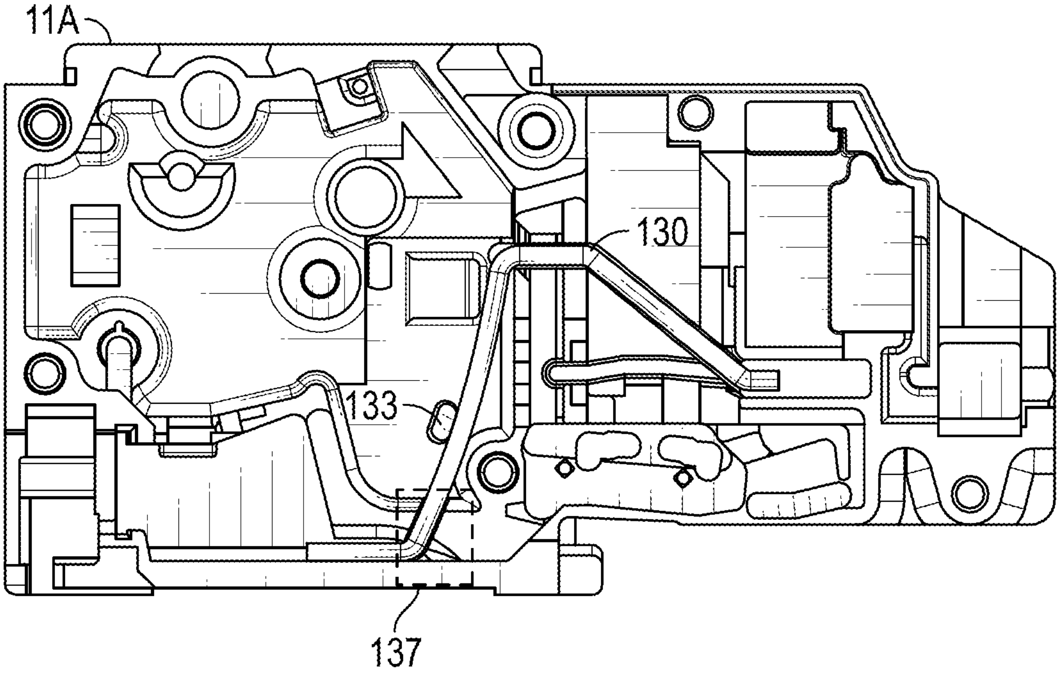
FIGS. 14A-B illustrate a second example retention mechanism for an example arc bypass wire of an example arc bypass assembly in a circuit breaker according to an example embodiment of the disclosed concept.
Figure 14B:
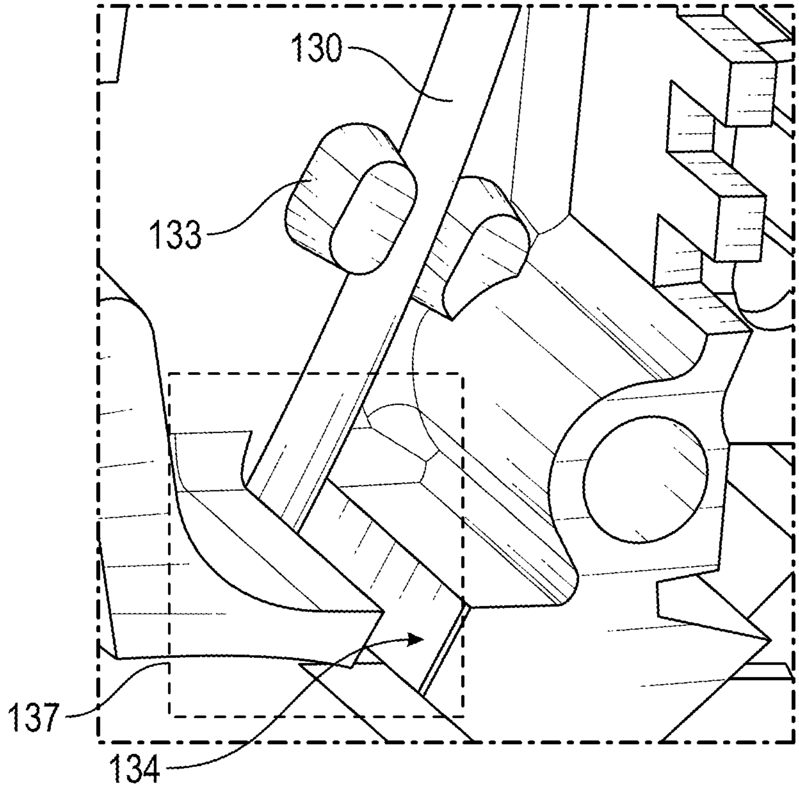

FIGS. 14A-B illustrate a second example retention mechanism for an example arc bypass wire 130 of an example arc bypass assembly 100 in a circuit breaker according to an example embodiment of the disclosed concept. A pair of posts 133 disposed on the housing 11A of the circuit breaker and separated by a gap less than the diameter of the arc bypass wire 130 is used as the molded retention mechanism in FIGS. 14A-B.

Figure 15B:
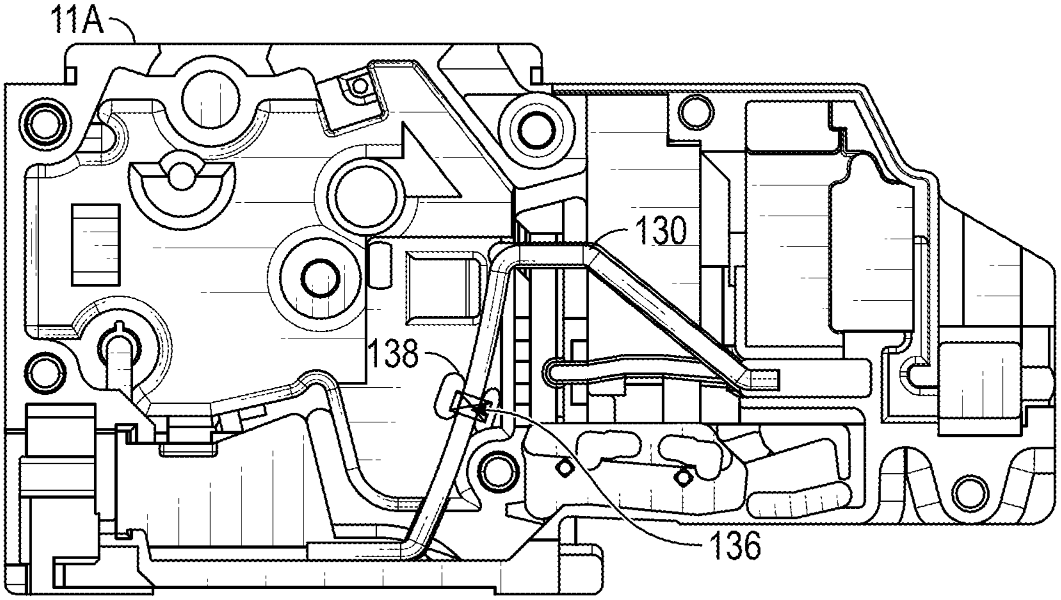
Figure 16:
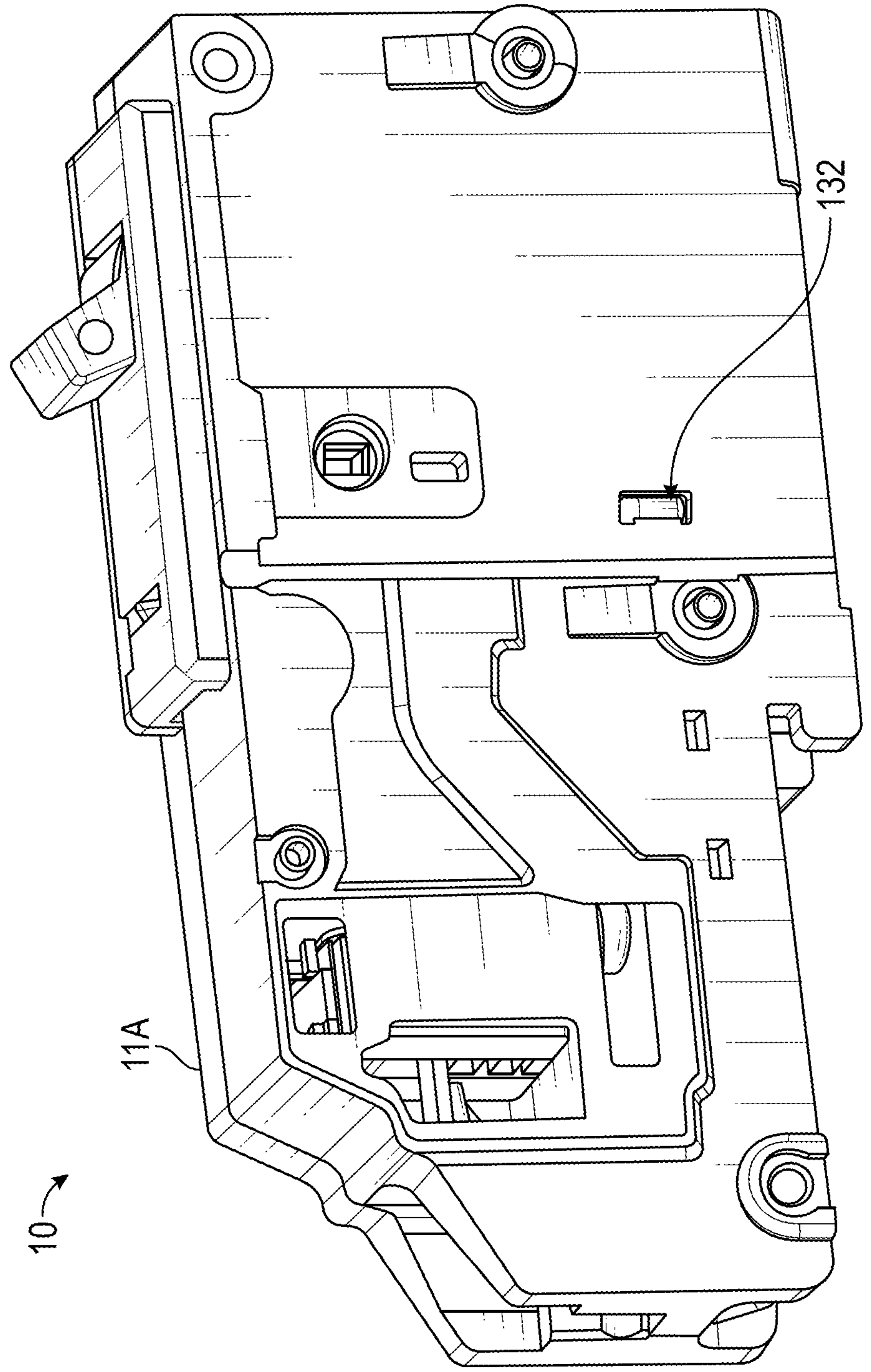
FIG. 16 illustrates a perspective view of a circuit breaker including an indicator according to an example embodiment of the disclosed concept.

FIGS. 15A-B illustrate a third example retention mechanism for an example arc bypass wire 130 of an example arc bypass assembly 100 in a circuit breaker according to an example embodiment of the disclosed concept. The molded retention mechanism may include a tie 136 tying the wire 130 to plastic housing 11A of the circuit breaker via a pair of through-holes 138. The indicator 132 may show whether the wire 130 is held in one position underneath the tie 136 and within the gap between the pair of through-holes 138.

FIG. 16 illustrates a perspective view of a circuit breaker 10 including an indicator 132 showing whether an arc bypass wire 130 is properly held in place by retention mechanisms according to an example embodiment of the disclosed concept.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An arc bypass assembly for use in a circuit breaker connected to a power source via a line-in conductor and a load via a load conductor, comprising:

an arc chute including a base, two arc sides extending from the base, and a plurality of arc plates arranged within the two arc sides, the arc chute structured to dissipate an arc upon opening of primary contacts of the circuit breaker during a high current event;

an arc horn extending outwardly from a first edge of the base of the arc chute toward a primary stationary contact coupled to the line-in conductor, the arc horn structured to attract the arc into the arc bypass assembly; and an arc bypass wire coupled to the base of the arc chute at one end and to a secondary stationary arm of the circuit breaker at the other end, the secondary stationary arm structured to be coupled to the load conductor, wherein the arc bypass assembly is structured to redirect a portion of current generated during the high current event to the load.

2. The arc bypass assembly of claim 1, wherein the portion of the current is redirected to the load without passing through secondary contacts of the circuit breaker.

3. The arc bypass assembly of claim 2, wherein the portion of the current is redirected to the load via a primary moving arm, the arc horn, the base of the arc chute, the arc bypass wire and the secondary stationary arm sequentially.

4. The arc bypass assembly of claim 1, wherein the arc horn is structured to provide a 90-degree corner at the first edge of the base of the arc chute.

5. The arc bypass assembly of claim 1, wherein the arc horn is a projection extending from the first edge of the base of the arc chute or an attachment fixed to the first edge of the base of the arc chute.

6. The arc bypass assembly of claim 1, wherein a width of the arc horn is smaller than a width of the base of the arc chute.

7. The arc bypass assembly of claim 1, wherein a length of the arc horn is sufficiently small to allow the arc bypass assembly to satisfy safety regulations.

8. The arc bypass assembly of claim 1, wherein the arc bypass wire comprises an arc bypass conductor within an insulation and is connected to the base of the arc chute at one end at a distance from an edge of the arc horn opposite the first edge of the base of the arc chute.

9. The arc bypass assembly of claim 8, wherein the distance from the edge of the arc horn prevents fusing of the arc bypass conductor as a result of generating the arc upon opening the primary contacts as a result of the high current event.

10. The arc bypass assembly of claim 1, wherein the current generated during the high current event includes arcing current, and the arc bypass assembly bypasses the arcing current by redirecting the portion of the current generated during the high current.

11. The arc bypass assembly of claim 1, wherein a housing of the circuit breaker comprises a retention mechanism structured to retain the arc bypass wire in a predetermined position.

12. The arc bypass assembly of claim 11, wherein the retention mechanism comprises one or more slots to receive one or more portions of the arc bypass wire.

13. The arc bypass assembly of claim 11, wherein the retention mechanism comprises a tab structured to hold the arc bypass wire in a predetermined place associated with the tab.

14. The arc bypass assembly of claim 11, wherein the housing of the circuit breaker further comprises an indicator structured to indicate whether the arc bypass wire is held in a predetermined place associated with a tab.

15. The arc bypass assembly of claim 11, wherein the retention mechanism comprises a pair of posts separated by a gap smaller that a diameter of the arc bypass wire, the arc bypass wire being press-fit within the gap.

16. The arc bypass assembly of claim 11, wherein the retention mechanism comprises a pair of through-holes separated by a gap smaller than a diameter of the arc bypass wire and a tie that ties the arc bypass wire within the gap via the pair of through-holes.

17. A circuit breaker structured to be coupled to a power source via a line-in conductor and a load via a load conductor, the circuit breaker comprising:

primary contacts having a primary moving contact coupled to a primary moving arm and a primary stationary contact coupled to a primary stationary arm at one end and structured to be coupled to the line-in conductor at another end;

an operating mechanism structured to cause the primary contacts to open and interrupt current from flowing to the load during a high current event;

secondary contacts having a secondary moving contact coupled to a secondary moving arm and a secondary stationary contact coupled to a secondary stationary arm structured to be coupled to the load conductor; and an arc bypass assembly disposed on a housing of the circuit breaker, the arc bypass assembly comprising:

an arc chute including a base, two arc sides extending from the base, and a plurality of arc plates arranged within the two arc sides, the arc chute structured to dissipate an arc upon opening of the primary contacts;

an arc horn extending outwardly from a first edge of the base of the arc chute toward the primary stationary contact, the arc horn structured to attract the arc; and an arc bypass wire coupled to the base of the arc chute at one end and to the secondary stationary arm at the other end, wherein the arc bypass assembly is structured to redirect a portion of current generated as a result of occurring of the high current event to the load.

18. The circuit breaker of claim 17, wherein the portion of the current is redirected to the load without passing through secondary contacts of the circuit breaker.

19. The arc bypass assembly of claim 18, wherein the portion of the current is redirected to the load via a primary moving arm, the arc horn, the base of the arc chute, the arc bypass wire and the secondary stationary arm sequentially.

* * * * *